United States Patent [19]
Hall

[11] 3,854,547
[45] Dec. 17, 1974

[54] AIR CUSHION VEHICLE
[75] Inventor: Arnold M. Hall, Westerly, R.I.
[73] Assignee: Hovermarine Corporation, Pittsburgh, Pa.
[22] Filed: Dec. 18, 1973
[21] Appl. No.: 425,849

[52] U.S. Cl. ............................. 180/117, 180/126
[51] Int. Cl. ............................................ B60v 1/04
[58] Field of Search .......... 180/116, 117, 119, 126, 180/128

[56] References Cited
UNITED STATES PATENTS

| | | | |
|---|---|---|---|
| 2,955,780 | 10/1960 | Hulbert | 180/117 |
| 3,106,260 | 10/1963 | Bollum, Sr. | 180/116 |
| 3,187,817 | 6/1965 | Colley | 180/117 |
| 3,208,543 | 9/1965 | Crowley | 180/116 |

Primary Examiner—David Schonberg
Assistant Examiner—Jack D. Rubenstein
Attorney, Agent, or Firm—Albert W. Hilburger

[57] ABSTRACT

A system of fluid delivery to the cushion of an air cushion vehicle includes a pair of fans positioned in ducts which extend from the atmosphere to the cushion. A plurality of louver mechanisms in the ducts can be operated so as to position the fans in a series relationship when it is desired to obtain maximum pressure in the cushion and to position the fans in a parallel relationship when it is desired to obtain a maximum rate of flow into the cushion. Venting mechanism are also provided to relieve the cushion of excess pressure. The louver and venting mechanisms are automatically operated as the vehicle traverses a surface of variable contours to tune the cushion according to motions of the vehicle induced by fluctuations of fluid conditions occurring in the cushion.

11 Claims, 18 Drawing Figures

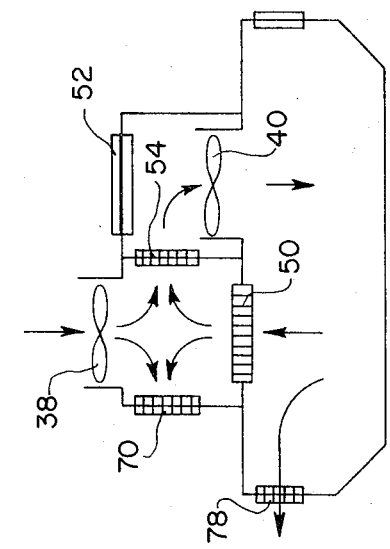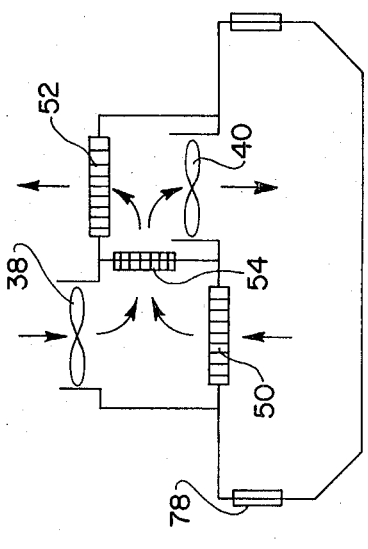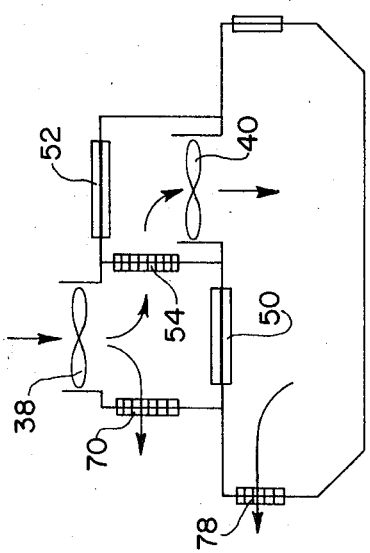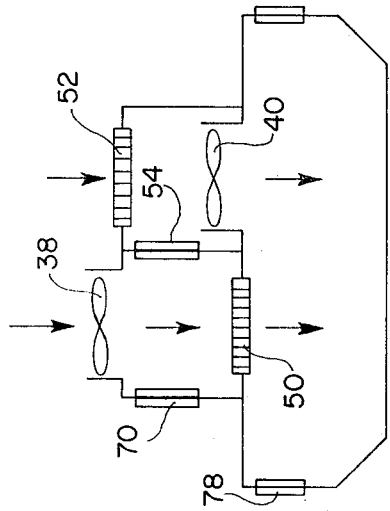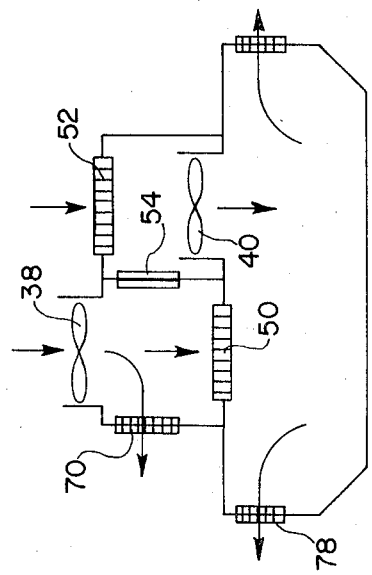

AIR CUSHION VEHICLE

BACKGROUND OF THE INVENTION

This invention relates generally to vehicles which are supported above a surface on a cushion of air, and more particularly, to an improved system of fluid delivery to the air cushion of an air cushion vehicle.

Whenever the term "air" is used herein, it will be taken to mean any suitable fluid, and whenever the term "air cushion vehicle" is used herein, it will be taken to mean any of a variety of vehicles which are at last partially supported by and operate above a cushion of suitable fluid, whether they be strictly landcraft, watercraft, or amphibious vehicles. The term "surface effect ship" is used herein to designate particularly a watercraft with sidehulls to contain the cushion along each side of the craft.

With the advent of air cushion vehicles into common usage a few years ago, travelers experienced a new concept in transportation which offered a number of distinct advantages over the various forms of transportation previously known. Among the advantages of the air cushion vehicle is its ability to operate over a variety of surfaces at higher speeds using less power, because a minimum of surface friction or drag is created. Land vehicles using the air cushion principle do not require finished surfaces such as roads. Similarly, watercraft using the air cushion principle are able to travel over either deep or shallow water, are capable of using the same docking facilities as conventional watercraft, are less prone to strike debris in the water, and offer a smoother ride, since a minimum of wave motion is transmitted to the hull of the watercraft. For these and other reasons, air cushion vehicles have proven to be successful and are presently in use throughout the world, both commercially and militarily.

In the early years of its development, the air cushion vehicle was designed for travel over relatively smooth surfaces, that is, over flat terrain or calm water. However, as its advantages became more and more apparent, efforts have been made to push the operational limits of those early models in terms of productivity and smoothness of ride.

The present invention serves to improve the operability of air cushioned vehicles be effectively tuning the properties of the vehicles cushion according to motions of the vehicle induced by pressure fluctuations occurring in the cushion. In short, the invention provides an air cushion system which is less sensitive to small, rapid changes in the terrain, or to short waives, as well as to surface changes of a much greater magnitude but reduced frequency depending on overall vehicle dynamics.

It is axiomatic that the motion of an air cushion vehicle is strongly influenced by the characteristics of the system of air delivery to the air cushion region. In particular, as the cushion volume and leakage areas change while the vehicle traverses uneven surfaces, the cushion pressure has a tendency to fluctuate causing generally vertical accelerations of the vehicle. A primary goal of this invention is to provide a cushion air delivery system which will minimize the fluctuation of cushion pressure when the vehicle is traversing uneven surfaces, either water or hard terrain, and thereby provide vehicle operation which is more comfortable and which results in lower vibratory acceleration levels.

In the past, it has been common practice to provide cushion air for air cushion vehicles by selecting fans of a single design and arranging these fans in multiple independent locations to supply the cushion with pressurized fluid. Various attempts have been made to more efficiently deliver air to the cushion. These have included attempts to improve the shape of the fan blades and to improve mechanisms for adjusting the pitch of the blades. The flow-pressure characteristic of these conventional fans was generally chosen so as to be relatively insensitive to changes in flow but, in fact, this desired end was not actually attained except for comparatively narrow ranges of operation of such conventional turbomachinery, including centrifugal, mixed flow, and axial fans.

SUMMARY OF THE INVENTION

In contrast, the present invention employs a pair of fans serving as sources of pressurized fluid for the cushion, ducts housing the fans and providing a path for the flow of fluid from the ambient condition into the cushion, and a plurality of louver and venting mechanisms associated with the fans and ducts which are selectively operable to provide a flat pressure versus flow characteristic for the combination of the fans. As flow is required to make up an increasing cushion volume due, for example, to passage of the vehicle over a valley or wave trough, a high flow rate of somewhat reduced pressure air for delivery to the cushion is required. At this instant, the louver mechanisms between the fans are operated to cause parallel flow fan operation. This results in total flow equal to a mutiple of the output of each fan with pressure rated for a single fan. Alternately, when the flow demand is reduced as, for example, due to passage of the vehicle over the crest of a hill or the crest of a wave, the louver mechanisms are operated to cause a series flow fan operation thereby providing an output pressure capability approaching twice the parallel mode, with flow as rated for a single fan. Throughout this process, venting louver mechanisms may be operated to relieve excess cushion pressure. The net result of the invention as disclosed herein is that the pressure versus flow characteristic of the pressurized fluid being directed into the cushion is represented by a curve which is notably flatter over a wide flow range than that which a single fan, or a plurality of single fans, as previously known and used, could provide.

It is to be understood that both the foregoing general description and the following detailed description are exemplary and explanatory but are not restrictive of the invention.

The accompanying drawings, which are incorporated in and constitute a part of this invention, illustrate a preferred embodiment of the invention and together with the description, serve to explain the principles of the invention.

Of the drawings:

FIGS. 13A, 13B, 14A, 14B, 14C, and 14D, are all schematic front elevation views in section of a plurality of operational modes of an air delivery system as disclosed by the present invention.

DETAILED DESCRIPTION OF THE INVENTION

Figure 1:
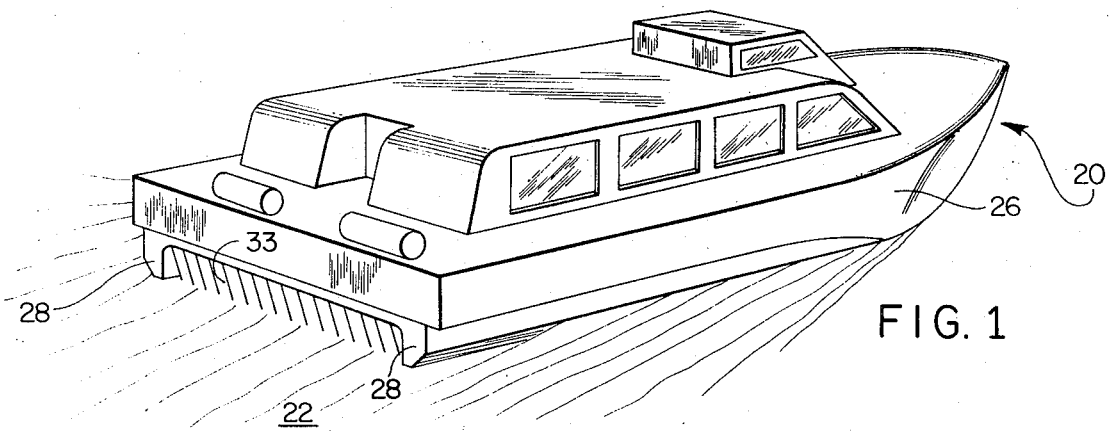
FIG. 1 is a perspective view of a surface effect ship utilizing the principles of the present invention.

Refer now to the drawings and initially to FIG. 1. Although the principles of the present invention are applicable to air cushion vehicles which are either watercraft or landcraft or amphibious, for ease of description, the illustrations and descriptions herein are limited to air cushion vehicles which are watercraft, otherwise known as surface effect ships. Accordingly, an air cushion vehicle 20 is shown in FIG. 1 supported above a surface of water 22 on a cushion of pressurized air 24. The vehicle 20 is generally of catamaran design having a main hull 26 supported on a pair of spaced sidehulls 28. Viewing FIG. 2, a bottom 30 of the hull 26 together with inner surfaces 31 of the sidehulls 28 define a plenum or cavity for the air cushion 24. Forward and aft flexible seals, 32 and 33 respectively, extend between the sidehulls 28 and thereby complete definition of the plenum for the air cushion 24.

Figure 2:
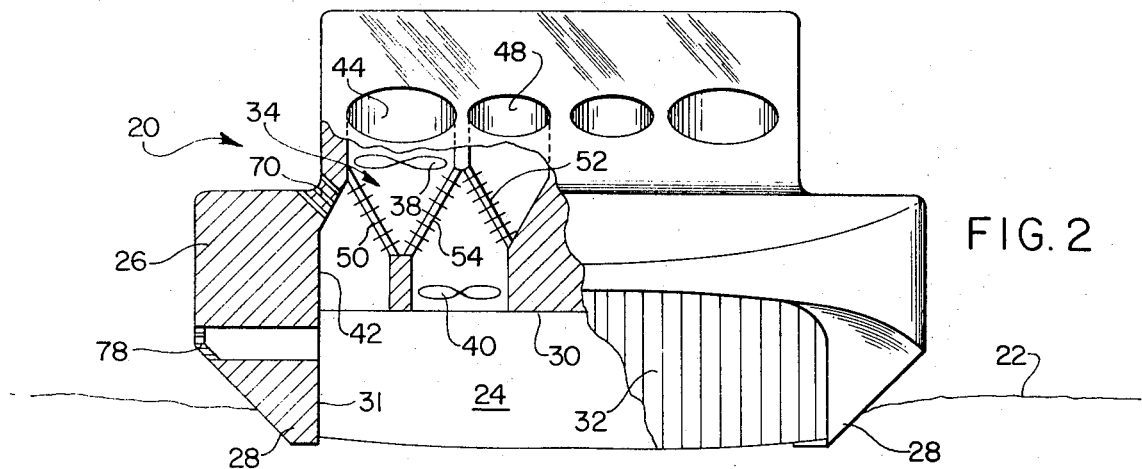
FIG. 2 is a front elevation view of the surface effect ship illustrated in FIG. 1, certain parts being cut away and shown in section.
Figure 3:
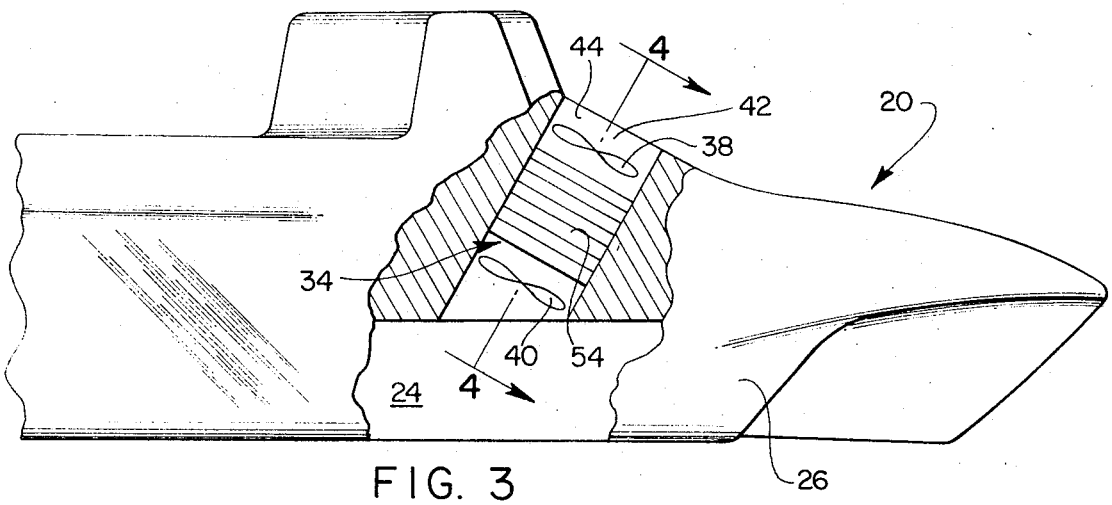
FIG. 3 is a side elevation view of a portion of the surface effect ship illustrated in FIG. 1, certain parts being cut away and shown in section.
Figure 4:
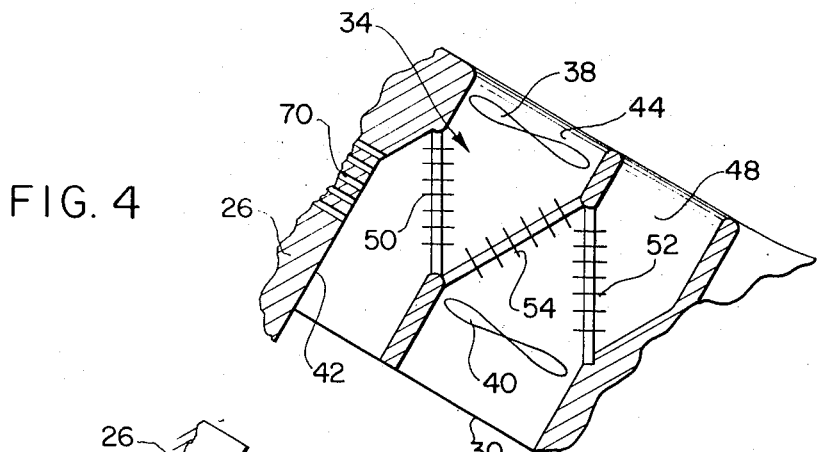
FIG. 4 is a detail cross-section view taken along line 4—4 in FIG. 3.

As particularly well seen in FIGS. 2, 3, and 4, ambient air is pressurized and directed into the air cushion 24 by means of an air delivery system generally indicated at 34. The air cushion 24, thus established, enables the vehicle 20 to be raised sufficiently above the surface 22 for the air to escape peripherally around the bottom edges of the flexible seals 32 and 33 at the same rate as it is pumped in. In some instances, part of the pressurized fluid is diverted to drive the vehicle, while in other instances, separate or auxiliary drive means are used.

In accordance with the invention, duct means extend between ambient fluid and the cushion of pressurized fluid; and first and second sources of pressurized fluid are provided for delivery to the cushion and located in said duct means. As here embodied, the first source is a fan 38 and the second source is a fan 40 (see FIGS. 2, 3, and 4). The fan 38 is suitably mounted in a duct 42 adjacent an air intake 44. The fan 40 is suitably mounted in a duct 46 adjacent the cushion 24 and remote from an air intake 48.

In accordance with the invention, louver means in said duct means are selectively operable to arrange said first and second sources in a series relationship to thereby obtain optimum pressure in the cushion under one occurring condition and to arrange said first and second sources in a parallel relationship to thereby obtain optimum flow into the cushion under another occurring condition. As here embodied, a first louver mechanism 50 is suitably mounted in the second duct 46 between the intake 48 and the fan 40. Similarly, a second louver mechanism 52 is suitably mounted in the second duct 46 between the intake 48 and the fan 40. In addition, a third louver mechanism 54 is suitably mounted in the first and second ducts 42 and 46 and serves to separate the fans 38 and 40 from one another.

It will be appreciated that when the louver mechanisms 50 and 52 are open and the louver mechanisms 54 are closed, the fans 38 and 40 operate in a parallel relationship to draw ambient fluid through their respective intakes 44 and 48 for delivery to the air cushion 24. In the alternative, in the event the louver mechanisms 50 and 52 are closed, and the louver mechanism 54 is opened, the fans 38 and 40 would operate in a series relationship to draw ambient fluid through the intake 44 for delivery to the air cushion 24.

Figure 5:
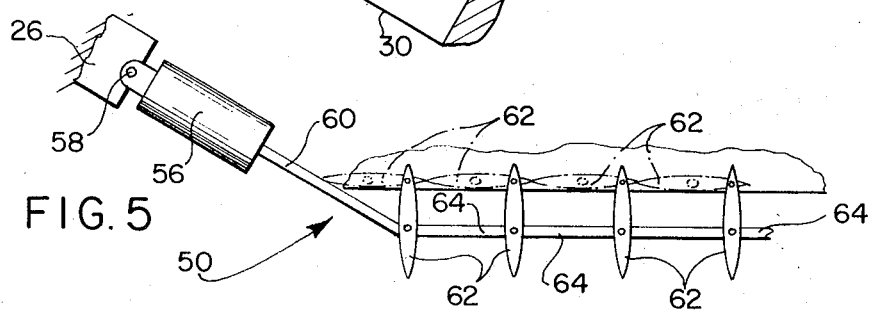
FIG. 5 is a schematic side elevation view of a louver operating mechanism for use with the invention.
Figure 6:
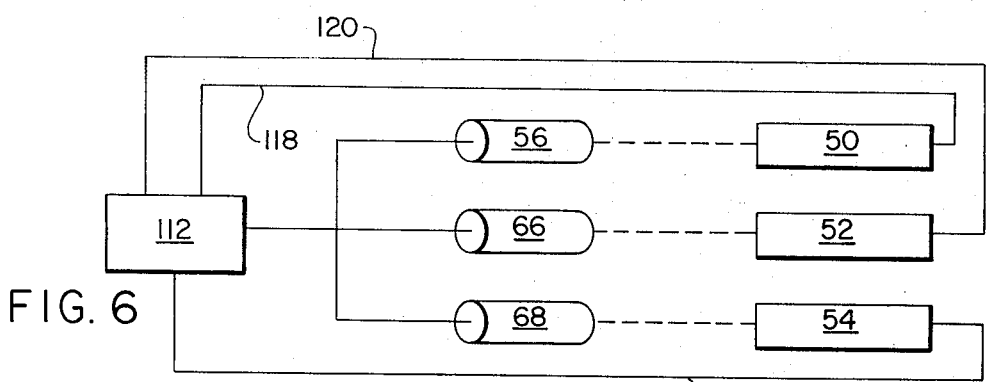
FIG. 6 is a schematic diagram illustrating controls for the operation of components comprising the invention.

In accordance with the invention, first, second, and third actuators are associated, respectively, with said first, second, and third louver mechanisms. As here embodied, the elements of each of the louver mechanisms 50, 52, and 54 are substantially similar and, for convenience, the elements of the louver mechanism 50 are schematically shown in FIG. 5. An acutator 56 is pivotally mounted to the hull 26 at 58 and serves to extend or retract a rod 60 which is pivotally connected to a first of a series of vanes 62. The vanes are, in turn, pivotally connected to one another by links 64 such that extension of the rod 60 opens the vanes 62, as shown by solid lines, while retraction of the rod 60 closes the vanes 62, as shown by dotted lines. This general arrangement is also shown in the schematic control diagram, FIG. 6. As seen in FIG. 6, an actuator 66 serves to operate the louver mechanism 52 and an actuator 68 serves to operate the louver mechanism 54.

Figure 7:
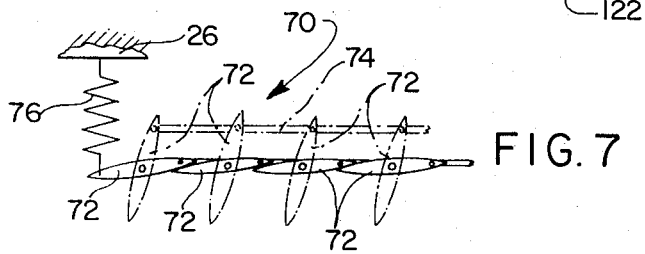
FIG. 7 is a schematic side elevation view of a vent operating mechanism for use with the invention.
Figure 8:
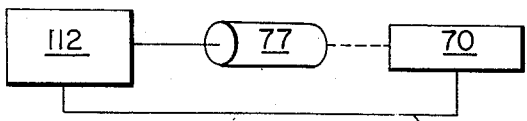
FIG. 8 is a schematic diagram illustrating an alternative scheme of operation of a louver operating mechanism.

In accordance with the invention, venting means are provided in said duct means movable between an open position venting fluid in said ducts means to ambient fluid and a closed position sealing fluid in said duct means from ambient fluid and means normally biasing said duct venting means to a closed position while enabling said duct venting means to open in response to a predetermined fluid pressure in said duct means. As here embodied, a duct venting mechanism 70 is generally illustrated in FIGS. 2 and 4 and elements comprising the mechanism are schematically shown in FIGS. 7 and 8. As illustrated therein, the venting mechanism 70 includes a plurality of vanes 72 pivotally mounted on the hull 26 and pivotally interconnected by means of links 74. A spring 76, or other suitable device, serves to hold the vanes 72 in a closed position, as shown by solid lines. However, upon an increase in pressure within the duct 42, the vanes 72 are rotated against the bias of the spring 76 to an open position as shown by dotted lines in FIG. 7. As another expedient in place of the spring 76, the vanes 72 might be weighted to a closed position but capable of opening upon the presence of a predetermined pressure in the duct 42. Alternatively, the duct venting mechanism 70 could be electro-mechanically operated by means of an actuator 77 as schematically shown in FIG. 8.

Figure 9:
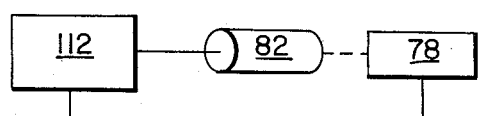
FIG. 9 is a schematic diagram illustrating an alternative scheme of operation of the venting mechanisms.

In accordance with the invention, venting means are provided in said hull and are movable between an open position and a closed position and means normally bias said hull venting means to a closed position but permit said hull venting means to open upon a predetermined fluid pressure in the air cushion. As here embodied, a hull venting mechanism 78 is generally illustrated in FIG. 2. Its construction could reasonably be similar to that illustrated in FIG. 7 for the duct venting mechanism 70 or it could be electromechanically operated by means of an actuator 82 as schematically shown in FIG. 9.

Figure 11:
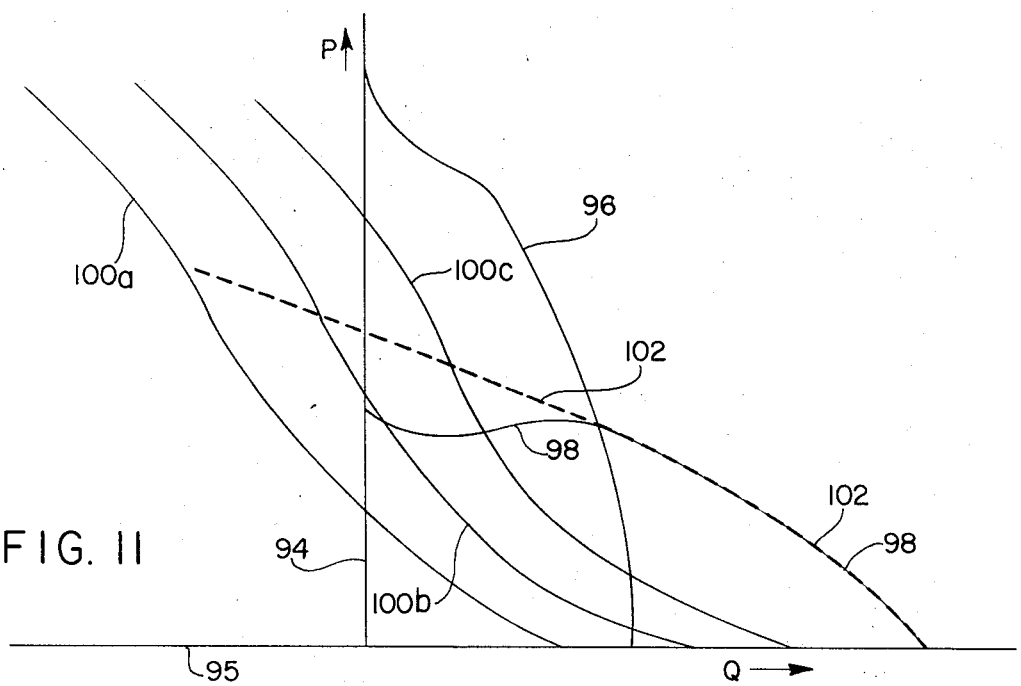
FIG. 11 is a pressure versus flow curve characteristic of an improved air delivery system for use with an air cushion vehicle, as disclosed by the present invention.
Figure 10:
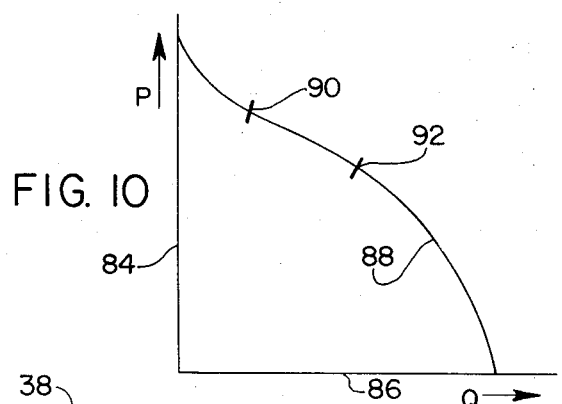
FIG. 10 is a pressure versus flow curve characteristic of conventional apparatus associated with air cushion vehicles.

The advantages accruing from the preceding description are best understood with reference to FIGS. 10 and 11.

FIG. 10 represents a flow versus pressure curve which is characteristic of a conventional air delivery system employing a single fan or a plurality of individual fans. In FIG. 10, an ordinate 84 represents pressure and an abscissa 86 represents flow. Although a characteristic curve 88 represents state-of-the-art for typical current turbomachinery and would be acceptable for many applications, the relatively narrow range of the curve 88 between the cross-marks 90 and 92 at which the curve is flattest, is not sufficient to provide the desired smoothness of craft motion.

FIG. 11 is illustrative of the advantages of the present invention over fluid delivery systems of the prior art. When the louver mechanisms 50 and 52 are closed and the louver mechanism 54 is opened such that the fans 38 and 40 assume a series relationship, they provide fluid to the air cushion 24 at a pressure twice that of an individual fan with flow as rated for a single fan. In FIG. 11, an ordinate 94 represents pressure, an abscissa 95 represents flow, and a curve 96 provides a typical pressure versus flow characteristic of the fan 38 and 40 operating in series.

When the louver mechanisms 50 and 52 are opened and the louver mechanism 54 is closed, the fans 38 and 40 assume a parallel relationship such that the fluid flow into the air cushion 24 is twice that of each individual fan while providing the rated pressure for a single fan. A curve 98 in FIG. 11 is characteristic of a typical pressure versus flow output from the fans 38 and 40 so acting in parallel.

As previously explained, it is desired to obtain a pressure versus flow characteristic which is substantially flatter over a wide flow range than that offered by a single fan arrangement as shown in FIG. 10, representing the prior art. The result is obtained by the combination of the fans, the louver mechanisms, and the venting mechanisms. Curves 100a, 100b, and 100c in FIG. 11 are the resultant pressure-flow characteristics when the fans 38 and 40 are operated in conjunction with the venting mechanisms 70 or 78. Curve 100a represents the venting mechanism 70 (FIG. 8) or venting mechanism 78 (FIG. 9) in a wide open position; curve 100b represents the venting mechanisms 70 or 78 being in a half-open position; and curve 100c represents the venting mechanisms 70 or 78 in a more closed position. It will be appreciated that an infinite number of curves between 100a and curves 96 and 98 are possible, according to the position of the venting mechanisms 70 or 78.

With continued reference to FIG. 11, a curve 102 represented by a dotted line represents a desired pressure versus flow characteristic of the combined fans 38 and 40 and venting mechanisms 70 and 78 which is noticably flatter over a wide flow range than the curve 88 (FIG. 10) which a single fan can deliver and flatter than either of the curves 96 or 98, just described. Indeed, the curve 102 is a combination of the curves 94 and 96, utilizing the venting mechanisms 70 or 78. It is noted that in the right hand region of FIG. 11, the curve 102 is substantially parallel to and, in fact, contiguous with the curve 98. However, to the left of its intersection with the curve 96, the curve 98 drops off quite sharply up to the ordinate 94, while the curve 102 continues its relatively gentle climb to the left. Even as the sudden dip in the curve 98 to the left of its intersection with the curve 96 is undesirable, just as undesirable is the steep ascent of the curve 96 as it approaches the ordinate 94. By opening the venting mechanisms 70 or 78, although the fans 38 and 40 when operating in series perform along the curve 96, the net result obtained in the air cushion 24 are the values of pressure and flow as indicated by the curve 102.

Figure 12:
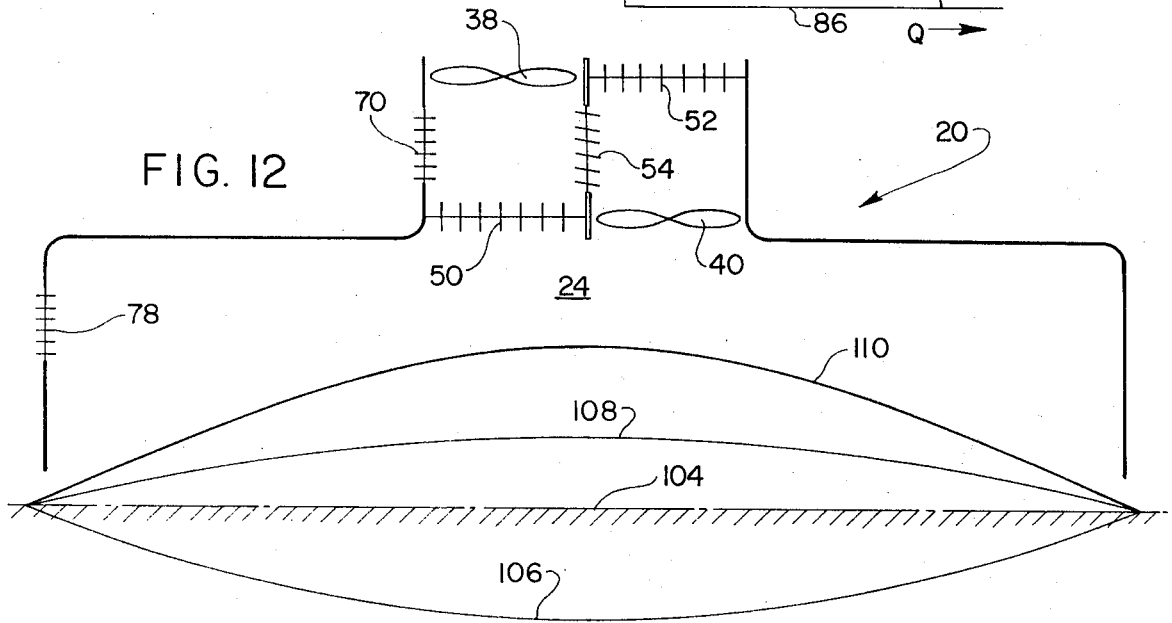
FIG. 12 is a schematic front elevation view of the air cushion vehicle representing a plurality of operational conditions to which an air cushion vehicle may be subjected.

Refer now to FIG. 12 which schematically represents four different, arbitrarily chosen, conditions which may be encountered by the vehicle 20. As an initial reference, a numeral 104 represents a nominal or ground plane over which the vehicle 20 advances. The plane 104, therefore, represents absolutely calm water for a watercraft and perfectly flat and smooth terrain for a landcraft. Other planes encountered by the vehicle 20 as it traverses uneven terrain or rough water, thus affecting the required instantaneous flow rate of the fan system, are indicated by reference numberals 106, 108, and 110.

To fulfill the requirements of the cushion 24 as the vehicle 20 traverses a surface having the characteristic of plane 104, the fans 38 and 40 could be typically operated in series without operating a venting mechanism 70 or 78. Alternatively, the fans 38 and 40 could be operated in parallel with the venting mechanisms 70 or 78 being opened lets the flow of fluid into the air cushion 24 drive the vehicle 20 to too high an altitude above the surface. However, as the vehicle 20 approaches a surface of which the plane 106 is characteristic, the air cushion 24, at that instant, will require a very high flow rate to fill the sudden increase in volume of the air cushion. As this instant, then it is desired to arrange the fans 38 and 40 for parallel flow and to close the venting mechanisms to assure that the cushion 24 will be filled in a minimum of time.

Assume now, that as the vehicle 20 advances, it suddenly encounters a surface of which the plane 108 is characteristic. In this instance, the volume of the air cushion. As this instant, then it is desired to arrange stantially less than the volume it has previously encountered. In this situation, then, it becomes desirable to arrange the fans 38 and 40 in series. This will maintain pressure in the cushion but at a substantially reduced flow rate. It would also be intended that the venting mechanisms would be operated to release the extra volume which is no longer necessary to support the vehicle 20.

Continuing to advance, the vehicle 20 next encounters a surface represented by the plane 110 which calls for a cushion volume even smaller than that previously encountered. In this situation, the fan operation would remain in a series relationship and the venting mechanisms might now be held wide open to vent the excess fluid as rapidly as possible.

As an aid to further understanding of the invention, refer once again to FIG. 6. In accordance with the invention, means are provided for sensing changes in the condition of the vehicle. As embodied herein, a sensor 112 may be suitably located within the air cushion 24, or elsewhere on the vehicle, adapted to measure changes in vehicle vertical position, vehicle vertical velocity, or changes in pressure within the air cushion 24. The sensor 112 may be any one of a number of commercially available devices capable of measuring changes in fluid pressure or vehicle motions and to generate a signal in response to a predetermined measurement to operate some other mechanism. With the vehicle 20 advancing over the nominal plane 104, the sensor 112 may be programmed for that surface condition to signal the actuator 56 to open the louver mechanism 50, to signal the actuator 66 to open the louver mechanism 22, and to signal the actuator 68 to close the louver mechanism 54, thereby placing the fans 38 and 40 in a parallel relationship. This relationship is schematically shown in FIG. 13A. Venting, which may be desirable to assure that excess flow does not enter the air cushion 24, may be achieved as schematically illustrated in FIG. 13B through either venting mechanisms 70 or 78 or through both of them. This can be achieved either by the increased pressure of the fluid acting on the vanes of the venting mechanism 70 or 78 against the bias of the spring 76 (see FIG. 7), or against the weight of the vanes themselves in the event they are weighted toward a normally closed position, or the sensor 112 may signal the actuator 77 to drive the venting mechanism 70 as schematically shown in FIG. 8. A feedback loop 114 in this latter situation, may be provided to assure that the venting mechanism 70 will be properly positioned in accordance with the conditions existing at that moment. Similarly, a feedback loop 116 may be provided to assure that the venting mechanism 78 will be properly positioned in accordance with conditions existing at the moment. In the same manner, and for the same general purpose, feedback loops 118, 120 and 121 may be provided in association with louver mechanisms 50, 52, and 54, respectively.

As the vehicle 20 approaches a surface of which the plane 106 is characteristic, and the volume of the air cushion 24 is thereby substantially increased, the sensor 112 agains signals actuators 56, 66 and 68 to operate the louver mechanisms 50, 52, and 54, as in the previous situation. However, because the amount of flow required to fill the air cushion 24 is so great, the venting mechanism will not be actuated, either by reason of the pressure in the cushion or by the sensor 112. (See FIG. 9)

As the vehicle 20 encounters a surface represented by the plane 110, the sensor 112 signals the actuators 56 and 66 to close their respective louver mechanisms 50 and 52 and signals the actuator 68 to open the louver mechanism 54. This will result in the series operation of the fans 38 and 40 as schematically shown in FIG. 14A. In this situation, it may not be necessary to vent fluid because of the normal losses occurring under the sidewalls 26 and the forward and aft flexible seals, 32 and 34.

When the vehicle 20 encounters a surface characterizd by the plane 110, the sensor 112 signals for the same operation of the louver mechanisms 50, 52, and 54 as in the previous situation. However, with the volume of the air cushion 24 being reduced so substantially from the previous situation, it will be necessary to vent excess fluid therein. This may be achieved by means of the hull venting mechanisms 70 or 78 previously described, and as shown schematically in FIG. 14B.

In the alternative, the sensor 112 may actuate the louver mechanisms 50 and 54 to an open position while keeping the louver mechanism 52 closed, and by additionally opening the venting mechanism 70, or 78 or both of them. In this manner, as seen in FIG. 14C, the fans 38 and 40 remain in a partially series relationship, but fluid in the air cushion 24 can vent through the louver mechanism 50, and the venting mechanism 70 or 78 or both of them into ambient fluid. Yet another possibility as seen in FIG. 14D, is to have the sensor 112 signal for all three of the louver mechanisms 50, 52 and 54 to be opened simultaneously. In this instance, excess fluid from the cushion 24 flows through the louver 50, then 54, then 52 into the atmosphere.

The air delivery system of this invention thus provides that fluid may be delivered to the cushion of the vehicle, such that it experiences a pressure versus flow characteristic which is noticably flatter over a wide flow range than that which was provided by systems previously known. As a result, the fluctuation of cushion pressure is minimized when the vehicle is traversing uneven surface so as to provide a more comfortable, level motion vehicle operation.

The invention in its broader aspects is not limited to the specific details shown and described, and departures may be made from such details without departing from the principles of the invention and without sacrificing its chief advantages.

What is claimed is:

1. An air cushion vehicle adapted for travel over a surface comprising:

a hull;

structure for maintaining a cushion of pressurized fluid beneath said hull at least partially supporting said hull above the surface as it proceeds;

duct means extending between ambient fluid and the cushion of pressurized fluid;

first and second sources of pressurized fluid for delivery to the cushion, said first and second sources located in said duct means; and louver means in said duct means selectively operable to arrange said first and second sources in a series relationship to thereby obtain optimum pressure in the cushion under one occurring condition and to arrange said first and second sources in a parallel relationship to thereby obtain optimum flow into the cushion under another occurring condition.

2. An air cushion vehicle as set forth in claim 1 comprising:

means for sensing the one and the other occurring conditions and operable to generate a signal thereupon; and actuating means associated with said louver means and operable upon signal from said sensing means to operate said louvers such that said first and second sources are arranged in a parallel relationship upon occurrence of the one occurring condition and such that said first and second sources are arranged in a series relationship upon occurrence of the other occurring condition.

3. An air cushion vehicle as set forth in claim 2 comprising:
venting means in said duct means movable between an open position venting fluid in said duct means to ambient fluid and a closed position sealing fluid in said duct means from ambient fluid, said duct venting means normally assuming a closed position; and
duct vent actuating means operable upon signal from said sensing means to move said duct venting means to an open position.

4. An air cushion vehicle as set forth in claim 2 comprising:
venting means in said hull movable between an open position venting fluid in the cushion to ambient fluid and a closed position sealing fluid in the cushion from ambient fluid, said hull venting means being normally biased to a closed position; and
hull vent actuating means operable upon signal from said sensing means to move said hull venting means to an open position.

5. An air cushion vehicle as set forth in claim 1 comprising:
venting means in said duct means movable between an open position venting fluid in said duct means to ambient fluid and a closed position sealing fluid in said duct means from ambient fluid;
means normally biasing said duct venting means to a closed position, said duct venting means being responsive to a predetermined fluid condition in said duct means to move to an open position.

6. An air cushion vehicle as set forth in claim 1 comprising:
venting means in said hull movable between an open position venting fluid in the cushion to ambient fluid and a closed position sealing fluid in the cushion from ambient fluid;
means normally biasing said hull venting means to a closed position, said hull venting means being responsive to a predetermined fluid condition in the cushion to move to an open position.

7. An air cushion vehicle adapted for travel over a surface comprising:
a hull;
structure defining a plenum for maintaining a cushion of pressurized fluid beneath said hull at least partially supporting said hull above the surface as it proceeds;
first and second fans mounted in said hull for directing fluid flow generally downwardly and having substantially parallel axes, said first fan positioned upstream of said second fan;
a first duct housing said first fan and extending from ambient fluid on the upstream side of said first fan to the cushion on the downstream side of said first fan;
a second duct adjacent to said first duct housing said second fan and extending from ambient fluid on the upstream side of said second fan to the cushion on the downstream side of said second fan;
a first louver mechanism in said first duct positioned between said first fan and the cushion and movable between open and closed positions;
a second louver mechanism in said second duct positioned between said second fan and the ambient fluid and movable between open and closed positions;
a third louver mechanism in said first and second ducts movable between an open position connecting said first and second fans such that they assume a series relationship and a closed position sealing said first and second fans from one another such that they assume a parallel relationship;
means for sensing changes in the condition of the vehicle;
first, second, and third actuators associated respectively with said first, second and third louver mechanisms and operable upon signal from said sensing means to selectively open and close their said associated louver systems, said sensing means responsive to a change in the condition of the vehicle to signal said first and second actuators to move said first and second louver systems to an open position and to signal said third actuator to move said third louver system to a closed position, said sensing means responsive to a decrease in the volume of the cushion to signal said first and second actuators to move said first and second louver mechanisms to a closed position and to signal said third actuator to move said third louver mechanism to an open position, whereby the effect on said hull of fluctuations in the conditions of the vehicle are held to a minimum.

8. An air cushion vehicle as set forth in claim 7 comprising:
a duct venting mechanism in said first duct movable between an open position sealing fluid in said first duct from ambient fluid; and
means normally biasing said duct venting mechanism to a closed position, said side venting mechanism responsive to a predetermined fluid condition in said first duct to move to an open position.

9. An air cushion vehicle as set forth in claim 7 wherein said sensing means generates a signal in response to a predetermined fluid condition in said first duct, and comprising:
a duct venting mechanism in said first duct movable between an open position venting fluid in said first duct to ambient fluid and a closed position sealing fluid in said first duct from ambient fluid, said first duct normally assuming a closed position; and
an actuator operable upon signal from said sensing means to move said duct venting mechanism to an open position.

10. An air cushion vehicle as set forth in claim 7 comprising:
a venting mechanism in said hull movable between an open position venting fluid in the cushion to ambient fluid and a closed position sealing fluid in the cushion from ambient fluid; and
means normally biasing said hull venting mechanism to a closed position, said hull venting mechanism responsive to a predetermined fluid condition in the cushion to move to an open position.

11. An air cushion vehicle as set forth in claim 7 wherein said sensing means generates a signal in response to a predetermined fluid condition in said cushion, and comprising:
a cushion venting mechanism in said hull movable between an open position venting fluid in the cushion to ambient fluid and a closed position sealing fluid in the cushion from ambient fluid, said hull venting mechanism normally assuming a closed position; and a hull vent actuator operable upon signal from said sensing means to move said hull venting mechanism to an open position.

* * * * *